United States Patent
Högström et al.

(10) Patent No.: US 8,457,813 B2
(45) Date of Patent: Jun. 4, 2013

(54) MEASURING OF A LANDING PLATFORM OF A SHIP

(75) Inventors: Tomas Högström, Linköping (SE); Johan Ehlin, Linköping (SE)

(73) Assignee: Saab AB, Linköping (SE)

( * ) Notice: Subject to any disclaimer, the term of this patent is extended or adjusted under 35 U.S.C. 154(b) by 100 days.

(21) Appl. No.: 13/139,886

(22) PCT Filed: Dec. 15, 2008

(86) PCT No.: PCT/SE2008/051457
§ 371 (c)(1), (2), (4) Date: Aug. 29, 2011

(87) PCT Pub. No.: WO2010/071502
PCT Pub. Date: Jun. 24, 2010

(65) Prior Publication Data
US 2011/0307126 A1    Dec. 15, 2011

(51) Int. Cl.
| G05D 1/08 | (2006.01) |
| G01S 5/16 | (2006.01) |
| G06F 19/00 | (2006.01) |
| G06G 7/70 | (2006.01) |

(52) U.S. Cl.
USPC .......................... 701/16; 73/178 T; 73/178 H

(58) Field of Classification Search
USPC ................. 701/16; 73/178 T, 178 H
See application file for complete search history.

(56) References Cited

U.S. PATENT DOCUMENTS

| 2,271,296 A | * | 1/1942 | Williams et al. ............ 353/12 |
| 2,444,933 A | * | 7/1948 | Jasperson ................. 318/581 |
| 3,112,980 A | * | 12/1963 | Gardner ................ 346/107.2 |
| 3,721,499 A | | 3/1973 | Narbaits-Jaureguy |
| 4,868,567 A | | 9/1989 | Eichweber |
| 4,914,460 A | | 4/1990 | Caimi et al. |
| 4,995,722 A | | 2/1991 | Sutour |

(Continued)

FOREIGN PATENT DOCUMENTS
| EP | 1555545 A1 | 7/2005 |
| WO | WO-2008061307 A1 | 5/2008 |

OTHER PUBLICATIONS

Z. Zhang et al.; "Evolving Neural Networks for Video Attitude and Height Sensor"; Proceedings of the SPIE—The International Society for Optical Engineering; 1995; vol. 2484; pp. 383-393; figures 1-3.
PCT/ISA/210—International Search Report—Jul. 30, 2009.
PCT/ISA/237—Written Opinion of the International Searching Authority—Jul. 30, 2009.

(Continued)

*Primary Examiner* — Mary Cheung
*Assistant Examiner* — Frederick Brushaber
(74) *Attorney, Agent, or Firm* — Venable LLP; Eric J. Franklin

(57) ABSTRACT

A system for predicting the movement of a surface for autonomous landing of unmanned aerial vehicles thereon. At least two beam emitters are each movable to measure along at least one line on the surface. The lines measured by the two beam emitters are crossed so that they have at least one point of intersection in common. A control module. A detector is configured to detect reflected beams. A processor is configured to process measurements including estimating continuously a plane to the surface by measurements during a time interval. A storage module is configured to store the processed measurements.

10 Claims, 2 Drawing Sheets

U.S. PATENT DOCUMENTS

| | | | |
|---|---|---|---|
| 7,095,488 B2 * | 8/2006 | Jamieson et al. | 356/5.01 |
| 2004/0141170 A1 * | 7/2004 | Jamieson et al. | 356/5.01 |
| 2004/0252293 A1 | 12/2004 | Laver et al. | |
| 2012/0158222 A1 * | 6/2012 | Ehlin et al. | 701/16 |

OTHER PUBLICATIONS

PCT/IPEA/409—International Preliminary Report on Patentability—Jan. 3, 2011.

* cited by examiner

MEASURING OF A LANDING PLATFORM OF A SHIP

CROSS-REFERENCE TO RELATED APPLICATIONS

This application is the national phase under 35 U.S.C. §371 of PCT/SE2008/051457 filed 15 Dec. 2008.

TECHNICAL FIELD

The present invention relates to a system and a method for autonomous landing of unmanned aerial vehicles on a surface.

BACKGROUND OF THE INVENTION

When landing an unmanned aerial vehicle (UAV), such as an unmanned helicopter, it is important that the aerial vehicle has access to accurate information regarding movement, position and attitude relative to the ground or landing area. In particular, when trying to land on a platform of a ship, the landing process is more difficult since the sea continuously changes the attitude of the ship and the landing platform. Also the fact that the ship is moving in a specific bearing further complicates the landing on the platform. The inclination of the platform is determined by the pitch and the roll, and there is also a movement in the vertical direction. For example, if there is a heavy sea, the amplitude of the waves can change the distance between the ship and the UAV by quite a large amount. It is important that an accurate prediction of the movements have been made before landing so that the right occasion can be chosen.

WO 2008/061307 discloses a method, which has application in the landing of a helicopter by determining the attitude of a remote surface wherein a laser transceiver is arranged to direct and detect a laser beam by the use of a mirror, which is used to rotate the emitted laser beam in order to trace out a conical surface. The base of the conical surface describes an oval shape on the landing area, and at different rotational positions a number of samples are taken. After a complete scan each 3D-point is stored into a buffer in a memory and passed to a software subroutine which calculates the plane of best fit to the stored points whereby the future positions of the remote surface can be predicted which is used in situations such when the landing platform is a moving deck of a ship.

EP 1 555 545 A1 discloses a multi-beam rangefinder system comprising a transmitter arrangement in which pulses are produced sequentially in three fixed non-coplanar directions, and the points which the pulses arrive at the ground define a plane. A planar model passing through these points then approximates the ground whereby it is possible to estimate range derived values including an altitude of the airborne platform relative to the ground, a time to land on the ground, roll and pitch as well as the angular velocity and angular acceleration.

A problem with the systems according to prior art is that they are more vulnerable and less flexible to disruptions. If one transmitter for some reason is disabled the whole system is more or less knocked-out. Furthermore if the helicopter is too high up in the air there is a risk that the tracking cone according to WO 2008/061307 is too large and misses the landing platform completely. A similar thing could happen in the system according to EP 1 555 545 A1 where any or all the pulses in the three fixed non-coplanar directions also could miss the landing platform.

Thus there is a need of a less vulnerable and more flexible arrangement in order to be able to land unmanned aerial vehicles on a surface, such as e.g. a moving landing platform of a ship.

OBJECTIVE OF THE INVENTION

It is therefore an objective of the present invention to provide a system and a method, that are less vulnerable to disruptions and more flexible in order to measure the inclination and movements of the platform of e.g. a ship and to predict the movements before landing.

SUMMARY OF THE INVENTION

This object is achieved according to the present invention by a system for predicting the movement of a surface for autonomous landing of unmanned aerial vehicles (UAVs), which comprises beam emitting means, control means, detector means to detect reflected beams, processing means to process measurements, and storing means to store the processed measurements, and which is characterized in that it comprises at least two beam emitting means, and in that each of the at least two beam emitting means is movable to measure along at least one line on the surface.

By this is achieved a less vulnerable system since the system comprises two movable beam emitting means and in case one of them is disabled it is still possible to uphold a functionality in order to complete the landing. The system is also more flexible since the movable beam emitting means make it easier to find the platform and start measuring.

The system is further characterized in that the lines measured by the two beam emitting means are crossed so that they have at least one point of intersection in common, and in that the two beam emitting means are arranged such that the movement is perpendicular to each other.

By this is achieved a measuring of the two dimensions of the landing platform in a cross and wherein the point of intersection should be equal for both the lines.

The system is further characterized in that each of the at least two beam emitting means is movable to measure along at least one line parallel to the at least one line on the surface, and that the measuring along any line is performed in successive steps.

By the use of a plurality of parallel lines it is also achieved that it is possible to measure the evenness of the surface, and if one of the emitting means is disabled the parallel displacement of will give an estimation of the other dimension of the surface.

This objective is also achieved according to the present invention by a method for predicting the movement of a surface for autonomous landing of unmanned aerial vehicles (UAVs) thereon, comprising the steps of: emitting beams, directing the beams towards the surface, detecting reflected beams and processing measurements, the method is characterized by the steps of emitting at least two beams; moving each of the at least two beams to measure along at least one line on the surface, storing the measurements, and estimating continuously during a time interval a plane to the surface in order to predict a favorable occasion to land thereon.

By this is achieved not only a method in unison with the characteristics of the system but also means to predict a favorable occasion for landing on e.g. the surface of the moving platform of the ship, preferably when the pitch and roll as well as the movements in the vertical direction are close to zero.

The method is further characterized in that the lines measured are crossed so that they have at least one point of intersection in common, that the emitted at least two beams are moved perpendicular to each other, and that each of the at least two beams is moved along at least one line parallel to the at least one line on the surface. Further on the measuring along any line is performed in successive steps.

DETAILED DESCRIPTION

Figure 1:
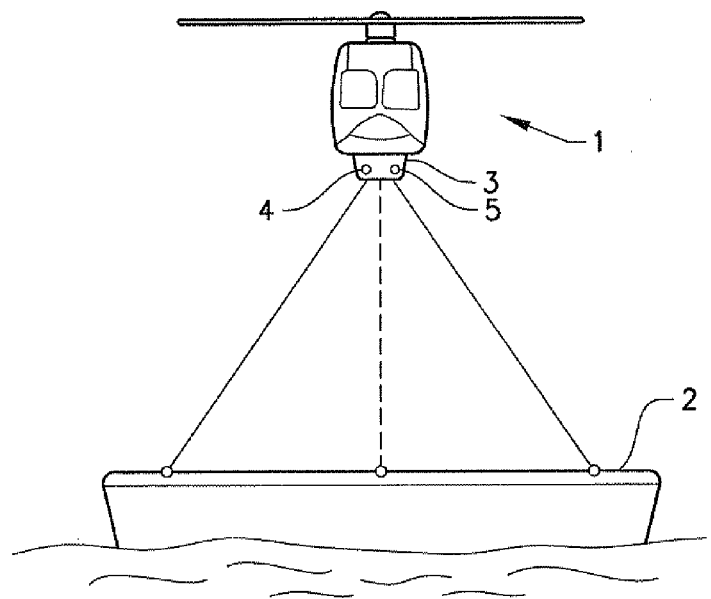
FIG. 1. shows schematically an unmanned aerial vehicle hovering above a surface of a landing platform.

FIG. 1 shows an unmanned aerial vehicle (UAV) 1, in the present case a helicopter, which has moved into a position above a surface 2 of the landing platform of a ship at sea. The UAV is equipped with a system 3 for autonomous landing which comprises at least two moveable laser distance meters 4, 5.

Figure 2:
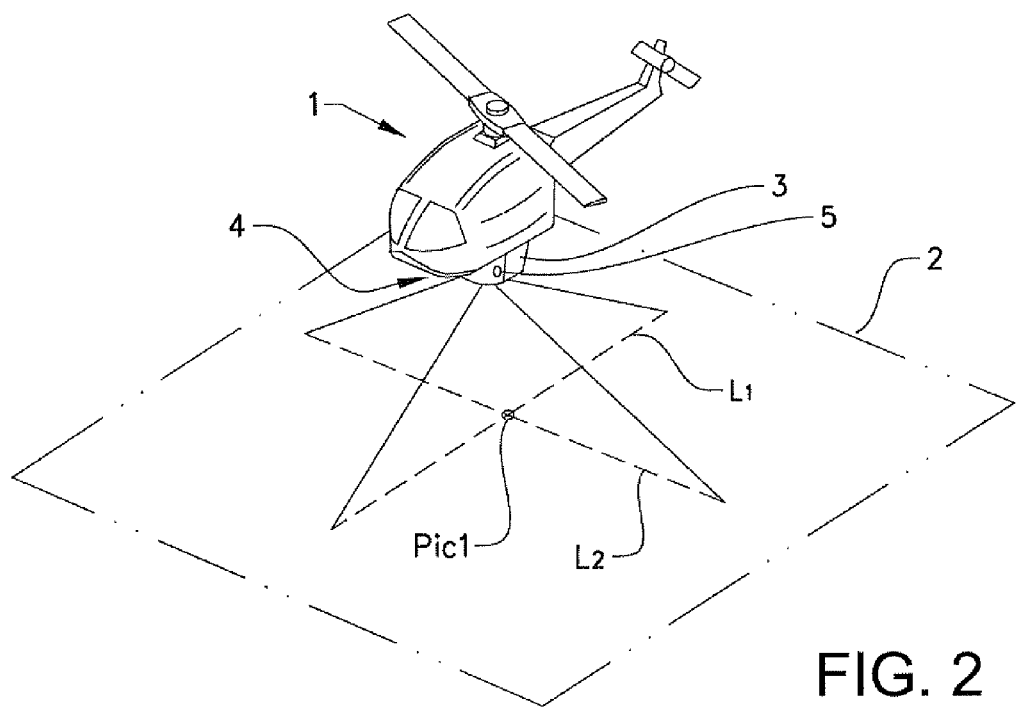
FIG. 2. illustrates schematically how a measuring of the surface of the landing platform is performed by the system for autonomous landing according to an embodiment of the invention.

In FIG. 2 it is illustrated how the measuring of the landing platform is performed according to an embodiment of the invention. The laser distance meters 4, 5 of the system 3 emit beams in rapid successive order in predetermined angle steps in such a way that spots are projected along at least one straight line (L1, L2) on the surface 2 of the platform by each of the laser distance meters. The movements of the laser distance meters are performed in a perpendicular direction to each other and consequently the at least two straight lines are crossed so that they have at least one point of intersection in common Pic1. This point thereby constitutes a control value since the same value should be obtained for each of the lines at the intersection point. The crossing of the lines does not need to be exactly perpendicular as long as one point of intersection is achieved. Each emitted laser beam from the laser distance meters is reflected back to the system and constitutes thereby a measurement of the distance between the UAV and that particular point on the surface. Between the reflections the laser distance meter moves into its next angle position, and thus both the angle and the distance are determined.

Figure 3:
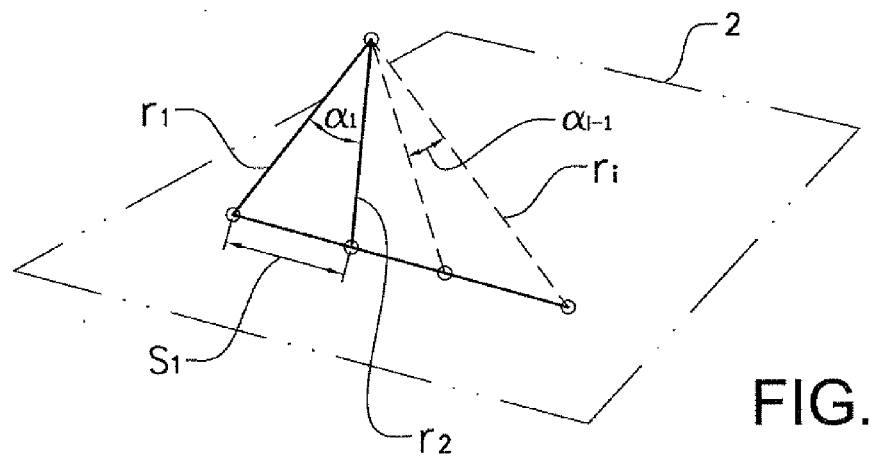
FIG. 3. illustrates schematically in more detail how a measuring of the surface of the landing platform is performed by the system for autonomous landing according to an embodiment of the invention.

FIG. 3 illustrates schematically more closely the measuring principle of an embodiment of the invention. If one considers the two first measured points on the surface in the series of successive measurements along a line, the distances from the laser distance meter above to each of the two points on the surface are known (r1, r2) by the time the beam has been reflected and detected, and so is the angle $\alpha_1$ between the imagined lines to these two points (i.e. a laser beam to each point of the two). Since these parameters are known the distance between the two points on the surface can be calculated. This distance on the surface (i.e. a first segment S1 of the line), and the distances (r1, r2) from the surface to the laser distance meter above all together constitute an imagined triangle. Since all the successive distances $r_i$ and angels $\alpha_{i-1}$ for each laser distance meter are known, then each line on the surface, or more thoroughly, all the segments that constitute each line, are also known. This could either be done by means of trigonometry, as briefly discussed above, by numerical methods (e.g. robust transforms), or in some other way known in prior art. It is also possible that the movement of each laser is continuous instead of moving in a series of successive steps, and hence the angle will be proportional to the movement during a time interval.

The system performs a complete cross-line measurement almost instantly of the surface of the landing platform. By processing these measurements it is possible to estimate the equation of a plane of best fit to the surface at that instant, by e.g. a least square method, and from these equations the altitude and the vertical movement, the pitch and roll angle, as well as the angular velocity and angular acceleration of the pitch and roll angles, respectively, could be determined. By repeating the procedure of estimating the equation of the plane for each instant cross-line measurement during a time interval, it will be possible to get enough measurement data to predict how the platform will move in a near future. The length of the time interval, before a command to land the helicopter is given, could be determined either when a periodic move-pattern of the platform has been found, or when some conditions of a predetermined wave equation model have been fulfilled. This model could be a more generally applicable wave equation model, or a specific wave equation model for each type of sea vessel. After this estimation of the surface, as well as a prediction of its movements based upon the measurements, a command is given to the aerial vehicle to land preferably at the moment the surface of the landing platform is predicted to become horizontal, i.e. pitch and roll are close to zero. In order to consecutively estimate the equation of the plane more accurate a Kalman filter, a least square fit and/or a rejection function may be used in combination with these equations.

Figure 4:
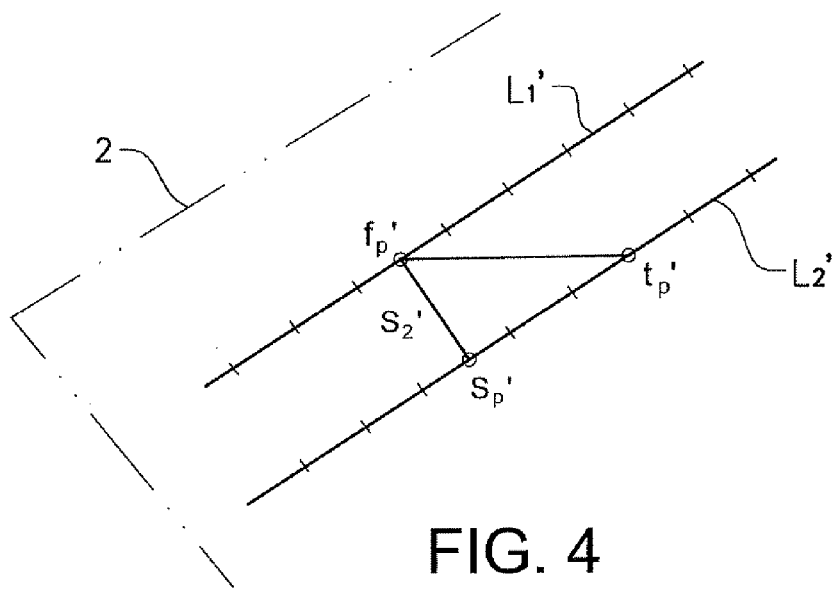
FIG. 4. illustrates schematically in further more detail how a measuring of the surface of the landing platform is performed according to an embodiment of the invention using parallel lines.

In one embodiment of the invention a plurality of parallel lines are projected on the surface. This could be achieved by a slight adjustment of each laser distance meter. This also makes the measuring of the surface more robust in the way that even if one of the laser distance meters is knocked-out, or disabled, the parallel displacement of two straight lines gives at least a minimal estimation of a distance in another dimension on the surface than the dimension given by the parallel straight lines, and hence some information about the inclination of the landing platform in the other dimension of the surface is achieved. If one considers a scenario where two parallel straight lines are projected on the surface 2, as can be seen in FIG. 4 the distance and the direction between a first point fp' in the first line L1' and a second point sp' in the second line L2' could be determined. Preferably points that are closest to each other in the two displaced parallel lines are chosen, and the distance between them calculated. This segment S2' hence becomes perpendicular to each of the lines and provides a measurement in the second dimension of the surface, but it is also possible to pair other points from the parallel lines as well as for example the first point fp' in the first line L1' and a third point tp' in the second line L2' . The use of a plurality of parallel lines also makes it possible to determine the evenness of the surface, which could be an advantage if the surface of the landing platform contains hindrance, or is a piece of the ground with a rough terrain comprising obstacles such as for example rocks, foliage, and/or other kinds of irregularities.

Figure 5:
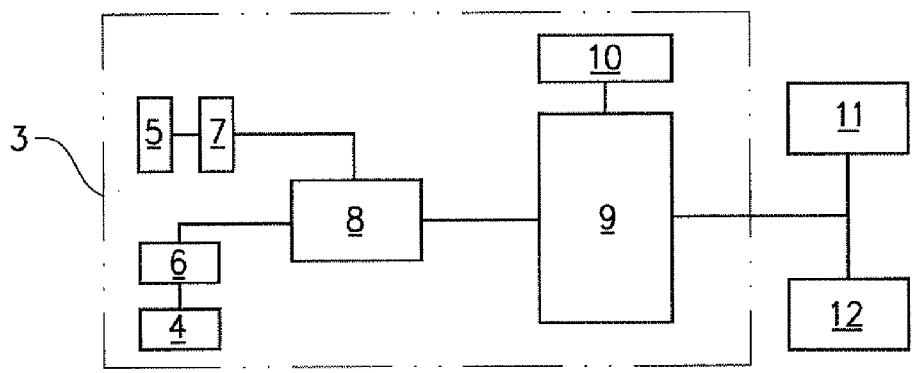
FIG. 5. shows a diagram of the system for autonomous landing according to the embodiments in FIG. 2, FIG. 3 and FIG. 4 of the invention

In FIG. 5 a diagram of the autonomous landing system 3 according to a preferred embodiment is shown in more detail. It comprises the first laser distance meter 4 and the second laser distance meter 5. Each of the laser distance meters transmits a laser beam. The first laser distance meter 4 is moved by a first control device 6, and the second laser distance meter 5 is moved by a second control device 7. The control devices may be electrical motors/or step motors. The reflected laser beams are detected by a detector 8 and these measurements are further converted into signals and distinguished from one another. It is also possible that each laser distance meter has its own configured detector in order to detect the reflected laser beams, for example, either by a difference in wavelength or by emitting the pulses in a specific order. The measurements are then communicated to and processed in a processing device 9. The system may also comprise a memory storage device 10 for storing the processed and/or unprocessed measurements. The memory storage device may also be used to store the wave equation models for later use by the processor.

Information regarding the movement, position and attitude of the UAV from e.g. sensors such as GPS (for example longitude, latitude, heading), inertial sensors, accelerometers and gyroscopes in 11 could be used together with the measurements of the surface in the system to govern the vehicle in accordance to the surface in order to be able to land thereon. This may be achieved by processing all these measurements in the processing device 9. Information regarding the movement, position and attitude of the ship may be received in the receiving device 12. The type of information could for example be transmitted GPS-data from the ship to the UAV during in flight to the platform, or during the landing on the platform. In the information further degrees of freedom may be comprised, such as the longitude, latitude and heading of the ship as well.

It is by the invention achieved a more flexible and robust system with a higher system safety. If, for example, one of the lasers is knocked-out, or disabled, it is still possible to estimate the inclination in at least one dimension. By the use of the measurement method of the present invention, in which the system operates at, the measurements are possible on the surface of the landing platform regardless of what conceivable altitude the UAV is positioned at.

This gives the advantage that an estimation of the moving platform can start immediately after it has been detected, which gives that more of the valuable measuring time can be used for sampling on the surface. By the use of the simple geometrical form wherein measured straight and crossed lines are used for the estimation, this inherently leads to less calculation paired with higher measurement accuracy. The use of simple geometry is not unessential, although the memory storage capacity nowadays is of less importance, the amount of measurement data could be vary large which in turn affects the processing time.

The system and the method are not restricted to a landing platform of a ship, but it could be any other type of moving surface and in another environment as well. The movements could also be slow or rapid.

The described embodiments can be modified without leaving the scope of invention, for example could the laser distance meters be other kind of devices, which emit beams in other frequencies of the electromagnetic spectrum.

The invention claimed is:

1. A system for predicting the movement of a surface for autonomous landing of unmanned aerial vehicles thereon, comprising:
    at least two beam emitters each being movable to measure along at least one line on the surface, wherein the lines measured by the two beam emitters are crossed so that they have at least one point of intersection in common;
    a control module;
    a detector configured to detect reflected beams,
    a processor configured to process measurements including estimating continuously a plane to the surface by measurements during a time interval; and
    a storage module configured to store the processed measurements.

2. The system according to claim 1, wherein the at least two beam emitters are arranged such that the movements are perpendicular to each other.

3. The system according to claim 1, wherein each of the at least two beam emitters is movable to measure along at least one line parallel to the at least one line on the surface.

4. The system according to claim 1, wherein the measuring along any line is performed in successive steps.

5. A method for predicting the movement of a surface for autonomous landing of unmanned aerial vehicles thereon, the method comprising:
    emitting beams;
    directing the beams towards the surface;
    detecting reflected beams;
    and processing measurements including estimating continuously a plane to the surface by measurements during a time interval,
    emitting at least two beams;
    moving each of the at least two beams to measure along at least one line on the surface;
    storing the measurements; and
    estimating continuously during a time interval a plane to the surface in order to predict a favorable occasion to land thereon,
    wherein the lines measured are crossed to that they have at least one point of intersection in common.

6. The method according to claim 5, wherein the emitted at least two beams are moved perpendicular to each other.

7. The method according to claim 6, wherein the measuring along any line is performed in successive steps.

8. The method according to claim 5, wherein each of the at least two beams is moved along at least one line parallel to the at least one line on the surface.

9. The method according to claim 8, wherein the measuring along any line is performed in successive steps.

10. The method according to claim 5, wherein the measuring along any line is performed in successive steps.

* * * * *

UNITED STATES PATENT AND TRADEMARK OFFICE
CERTIFICATE OF CORRECTION

| | | |
|---|---|---|
| PATENT NO. | : 8,457,813 B2 | Page 1 of 1 |
| APPLICATION NO. | : 13/139886 | |
| DATED | : June 4, 2013 | |
| INVENTOR(S) | : Hogstrom et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 175 days.

Signed and Sealed this
Ninth Day of December, 2014

Michelle K. Lee
*Deputy Director of the United States Patent and Trademark Office*